United States Patent [19]

Gerquest

[11] 4,262,530
[45] Apr. 21, 1981

[54] SYSTEM FOR MEASURING OIL CONSUMPTION

[76] Inventor: Arthur S. Gerquest, 334 Wire Mill Rd., Stamford, Conn. 06903

[21] Appl. No.: 957,133

[22] Filed: Nov. 6, 1978

Related U.S. Application Data

[63] Continuation-in-part of Ser. No. 832,333, Sep. 12, 1977, abandoned.

[51] Int. Cl.³ .............................................. G01F 1/00
[52] U.S. Cl. .................................................. 73/861.8
[58] Field of Search .................... 73/112, 194 R, 211, 73/194 M, 194 E; 58/145 R

[56] References Cited

U.S. PATENT DOCUMENTS

| | | | |
|---|---|---|---|
| 2,296,540 | 9/1942 | Schurz | 58/145 R |
| 2,333,758 | 11/1943 | Xenis et al. | 73/112 |

Primary Examiner—Anthony V. Ciarlante
Attorney, Agent, or Firm—Pennie & Edmonds

[57] ABSTRACT

A system for measuring the quantity of fuel oil consumed by a furnace burner of the gun type and particularly one used in home heating. Without the need to incorporate a device such as a sensor into existing fuel supply lines or fuel storage tank, the system predicates the fact that oil burner nozzles deliver an accurately constant rate of flow. The fuel consumption of the burner may, therefore, be computed accurately by providing a meter to measure the accumulated elapsed time during which the burner is in operation and then convert this information to gallons (or other units) consumed, by multiplying the accumulated time by an appropriately chosen factor, related directly to the delivery rate of the nozzle.

4 Claims, 4 Drawing Figures

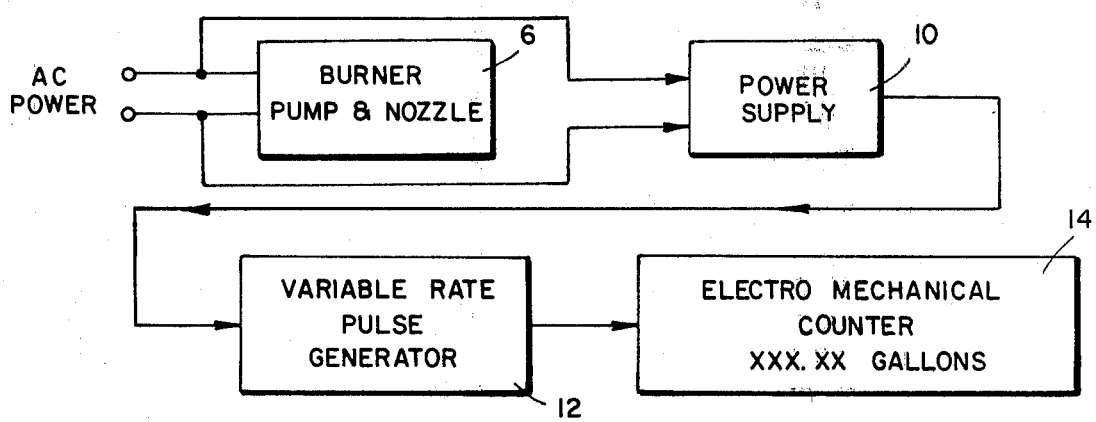
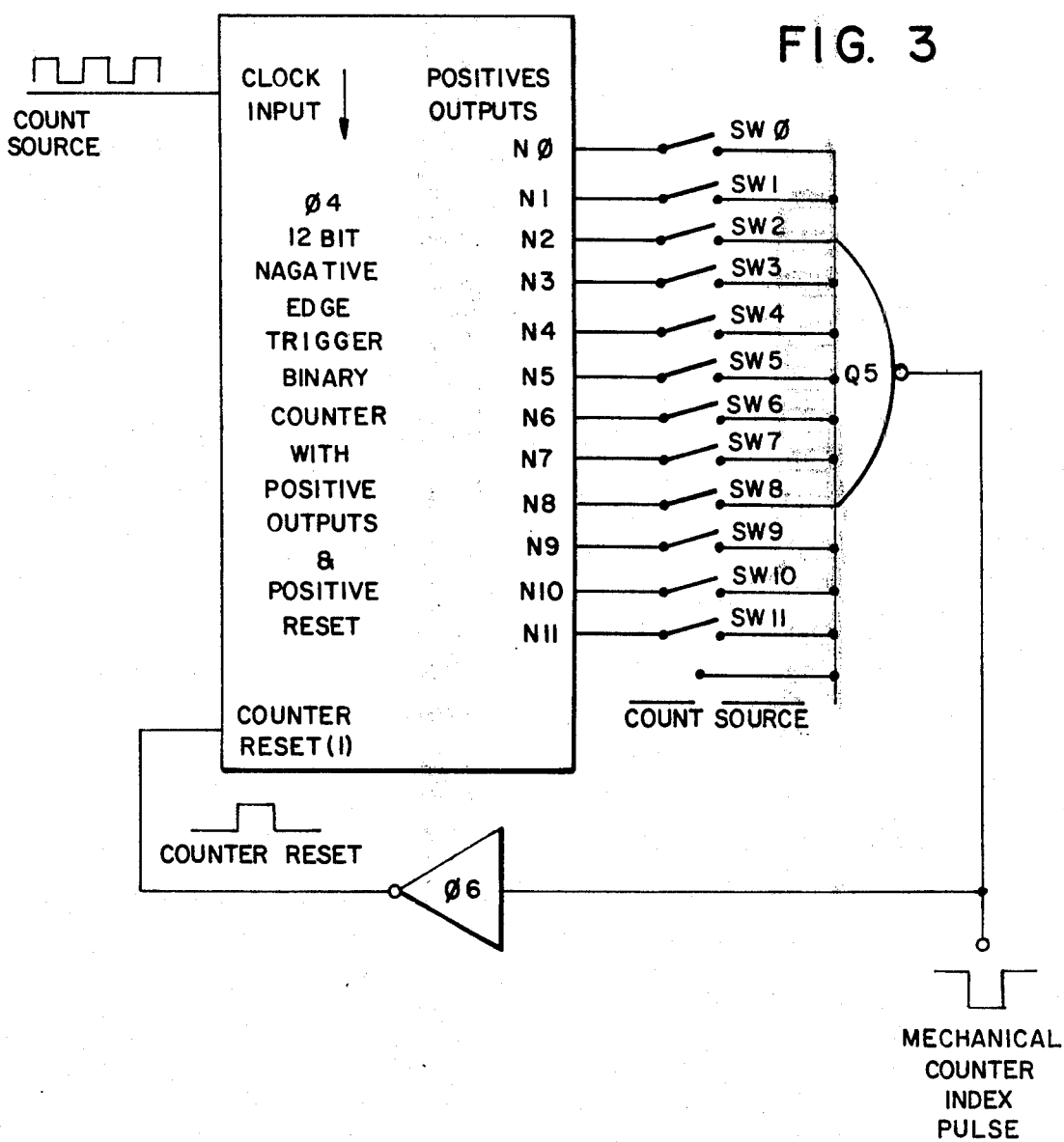

SYSTEM FOR MEASURING OIL CONSUMPTION

This is a continuation-in-part of pending patent application Ser. No. 832,333, 9/12/77, now abandoned.

With world-wide energy scarcity being widely accepted as a reality, there is growing concern and interest in conservation, especially among home owners seeking to minimize their energy costs. The present invention addresses itself to this end by providing the homeowner with an inexpensive and convenient means for monitoring the quantity of fuel consumed. This invention gives the homeowner a valid basis for the management of his home heating system, and makes it possible for him to observe the effects upon fuel consumption of modifications in his use of the heating system, as for example, observing changes in consumption as a result of various settings of the house thermostat thus providing him with a basis for establishing optimum day and night settings that minimize consumption and yet afford acceptable comfort. Similar observations may be made as other conservation policies are adopted such as closing off parts of the house, reducing heat in little used areas, installing insulation and/or storm windows, using alternative heating supplements; i.e., solar, wood, etc.

Probably the most significant quantity that the homeowner will wish to monitor, having this invention available to him, is the daily rate of consumption. It may be desirable to manage the heating system so as to tend to maintain an essentially constant daily consumption during the steady cold of the deep winter.

Of course, this invented system may be used to measure other rates, such as gallons per week or month, or the total number of gallons consumed during the entire heating season. This latter figure may be correlated into the number of degree days of the season, a figure widely publicized. The invention may also be used to record the consumption between fuel-oil deliveries in which case, assuming the tank is filled to the same level at each delivery, the reading given by this consumption meter should agree with the quantity billed by the supplier.

The underlying concept upon which this invention rests is the recognition that an indirect measurement of fuel consumption may be made by (1) knowing the delivery rate of the oil burner nozzle in gallons per hour (or other units) and (2) measuring and accumulating the elapsed time during which the burner has been in operation for a specified period of time. The fuel oil consumption during the specified period is then given by the following relation:

Consumption (gallons) = Nozzle Rate (gallons per hour) times Elapsed time (hours).

For this relationship to hold accurately, it is necessary that the actual delivery rate of the nozzle be closely equal to the specified rate of the particular nozzle used. Factors such as the pressure of the fuel entering the nozzle and the viscosity of the fuel oil (essentially a function of fuel temperature) affect the actual delivery rate. Pump pressure and viscosity variations are such that departures of the actual rate from the specified or calibrated rate, are negligible and have an insignificant effect upon the accuracy of the metering system.

This invention is capable of being implemented in such a way as to provide a continuous record of fuel consumption beginning at a chosen point in time. It can, of course, be implemented in other ways to provide a consumption figure for any desired period; e.g., per hour, day, week, month, season, etc.

IMPLEMENTATION OBJECTIVES

It should be observed that much of the value of this invention must rest, of necessity, upon two important use factors:

(1) convenience to the user—the homeowner, for example, and
(2) convenience to the supplier of the system.

According to the invention there is a direct-reading meter displaying gallons consumed during a predetermined time period, say, 24 hours, and a convenient method for resetting or "zeroing" the number to begin a new time period.

One object of the invention is to provide a fuel metering system capable of accurately measuring fuel oil consumed over a prescribed period of time.

Another object of the invention is to provide a fuel consumption meter the components of which are entirely extraneous to the fuel burner and its various flow lines.

Other objects and advantages of the invention may be appreciated on reading the following description of one embodiment thereof which is taken in conjunction with the accompanying drawings, in which:

FIG. 1 is a block diagram of the novel fuel consumption meter;

FIG. 3 is a diagram of the binary counter divider serving as a variable counter frequency generator.

Figure 2:
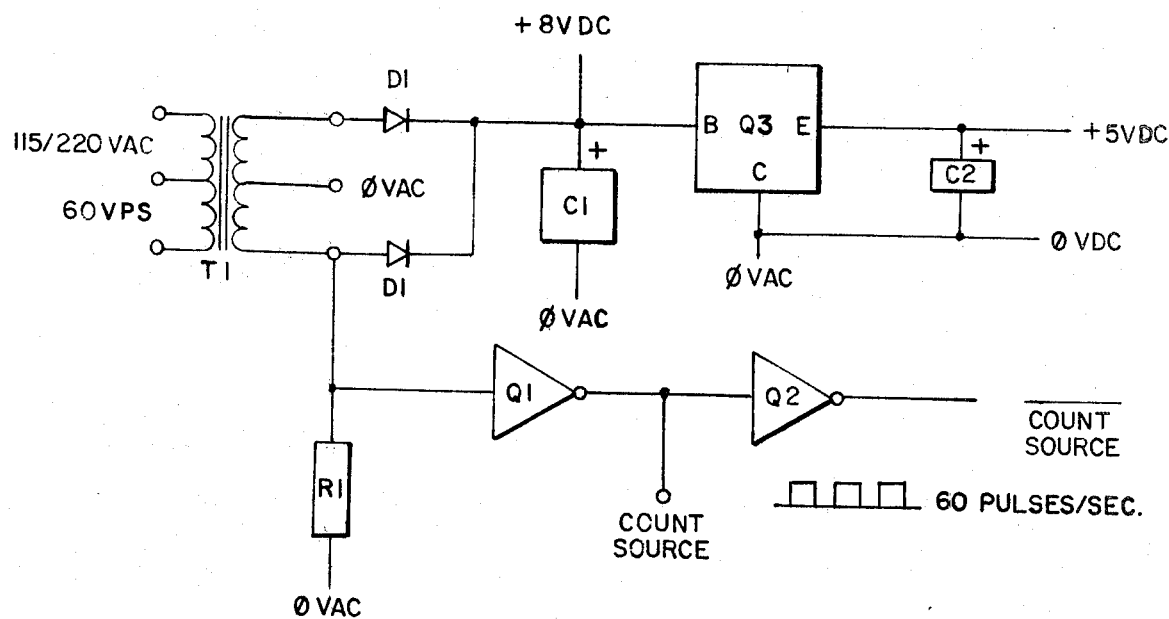
FIG. 2 is a circuit diagram for the oscillator source and the power supply for the meter.

Fuel consumption is measured by indexing a mechanical counter at a rate proportional to the known nozzle delivery rate whenever the burner fuel pump is energized.

The mechanical counter shown in FIG. 1 serves as a memory device. A.C. power is supplied to both a burner 6 and a counter power supply 10 for a variable pulse generating circuit 12. The pulse generator drives counter 14 which essentially comprises an indexing solenoid. The pulse rate is field set to the given burner nozzle delivery rate.

The mechanical counter is indexed at a rate of nozzle gallons per hour times 100. Count errors due to turn-on/off or spurious noise have a limit of 1/100 gallon per occurrence.

A counter index rate of ten pulses per second (upper limit for inexpensive counters) would match a 360 gallon per hour delivery rate:

$$\left(\frac{10 \text{ Counts}}{\text{Sec.}}\right)\left(\frac{60 \text{ Sec.}}{\text{Min.}}\right)\left(\frac{60 \text{ Min.}}{\text{Hr.}}\right) \text{ equals } \frac{36000 \text{ Counts}}{\text{Hour}}$$

$$\frac{36000 \text{ Counts per Hour}}{100} \text{ equals } 360 \text{ Gallons per Hour.}$$

By using a 60 pulse per second oscillator source and a 12 bit binary divider as the variable rate pulse generator, a lower limit of $$\frac{60 \frac{\text{Counts}}{\text{Sec.}} \quad 60 \frac{\text{Sec.}}{\text{Min.}} \quad 60 \frac{\text{Min.}}{\text{Hr.}}}{(4095)(100)} \text{ equals } 0.53 \text{ gallons per hour}$$

is obtained. 4095 equals $(2)^{12}-1$, maximum count for 12 bit binary counter.

Typical burner nozzle rates are in steps of 0.05 gallons per hour at the low end.

As shown in FIG. 2 center-tap, step-down transformer (T1) isolates the device and provides low voltage A.C. Diode pair (D1) converts this input to full-wave D.C. (C1) filters the input to provide 8 volts D.C. (counter solenoid supply). Three terminal regulator Q3 generates a 5 volt D.C. supply for the logic circuits. The component (C2) is a simple noise filter.

One side of the transformer is used as a 60 pulse per second signal source. Schmitt Trigger amplifier Q1 shapes this signal into a 60 pulse per second oscillator source and Schmitt Trigger Q2 inverts the signal.

Referring to FIG. 3 certain outputs of a 12 bit binary counter Q4 are connected to 13-input nand gate Q5. When each connected counter output is in the logic one state (desired number of input pulses) the output of the gate Q5 resets the counter to zero and indexes the mechanical counter.

The 13 input nand gate Q5 will have a low output when none of its inputs are at ground. This output is inverted by Schmitt Trigger amplifier Q6 and connected to the counter Q4 reset. As the first counter output is reset to zero, the nand gate Q5 output will return high. The output of Schmitt Trigger amplifier Q6 holds the reset input of counter Q4 high long enough to allow all bits to reset.

Since counter Q4 is a binary counter, at least one jumpered output and thus one gate Q5 input will be at ground for each counter state until the desired count is reached.

The variable rate pulse generator thus produces one output pulse (electromechanical index pulse) with every (1 to 4095) oscillator input pulses.

| Example: | Reset counter every 9 counts | | | | |
|---|---|---|---|---|---|
| | 9 equals 8 plus 1 | | | | |
| | 9 equals $(2)^3$ plus $(2)^0$ | | | | |
| | Jumper counter Q4 outputs N4 and N1 | | | | |
| | Note: Output $N_N$ has value $(2)^{N-1}$ | | | | |
| Counter Output: | | N4 | N3 | N2 | N1 |
| Binary Value: | | (8) | (4) | (2) | (1) |
| Input Pulse: | 0 | 0 | 0 | 0 | 0 |
| | 1 | 0 | 0 | 0 | 1 |
| | 2 | 0 | 0 | 1 | 0 |
| | 3 | 0 | 0 | 1 | 1 |
| | 4 | 0 | 1 | 0 | 0 |
| | 5 | 0 | 1 | 0 | 1 |
| | 6 | 0 | 1 | 1 | 0 |
| | 7 | 0 | 1 | 1 | 1 |
| | 8 | 1 | 0 | 0 | 0 |
| | 9 | 1 | 0 | 0 | 1 |
| | | First state with | | | |
| | | N1 = N4 = 1 | | | |

Figure 4:
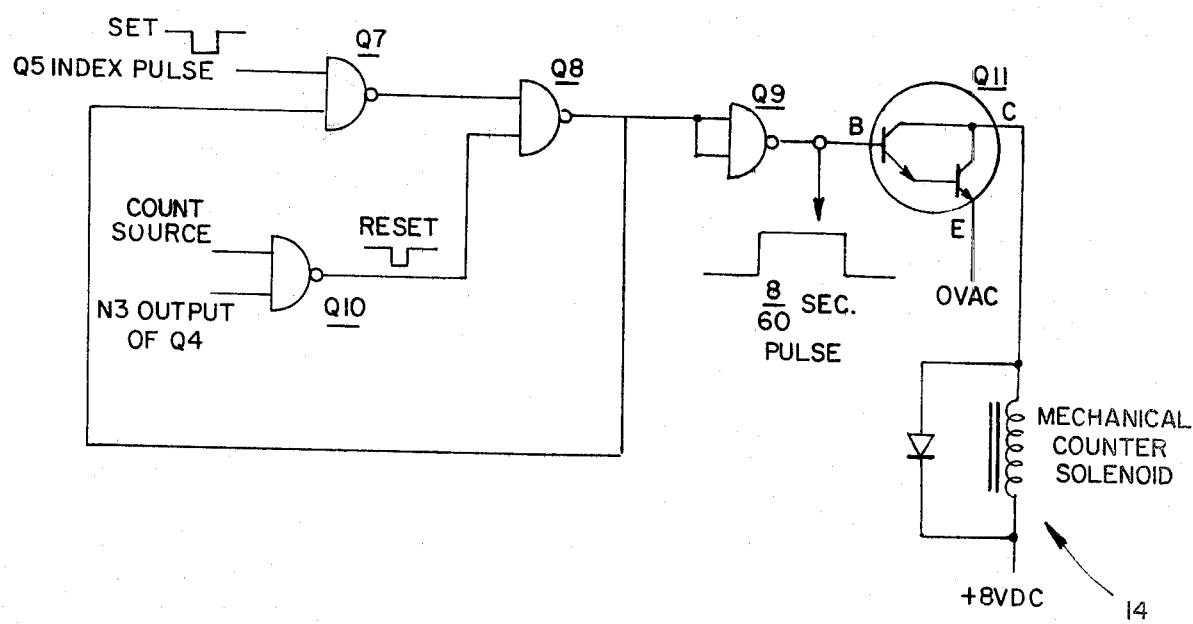
FIG. 4 is a circuit diagram of the counter solenoid circuit.

The output pulse from gate Q5 is a short pulse insufficient in duration and power to drive the counter solenoid. Two input nand gates Q7 and Q8 (FIG. 4) form a Bi-stable circuit to drive the counter solenoid.

Gate Q9 isolates the Bi-stable circuit. If gate Q9 is a DTL type circuit, its one-state current will drive Darlington amplifier Q11. When the outputs of counter Q4 are reset the output of gate Q7 is driven high. Output of gate Q8 will be low and output of Q9 will be high. Darlington amplifier Q11 will be on to energize the solenoid counter 14. With a low reset pulse input to gate Q8 the Darlington amplifier will be held off until the next counter cycle.

The N3 output of the counter Q4; i.e., (binary count of 8) is gated with the count pulse signal in nand gate Q10. The resulting output signal of Q10 is used to reset the Bi-stable circuit formed by Q7 and Q8.

Gating Q4 output N3 with the count pulse signal protects against an attempt to set and reset the solenoid drive circuit at the same time. The solenoid coil will be driven for 8 count input periods each time the binary counter is reset to zero.

Various modifications of the invention may be effected by persons skilled in the art without departing from the scope and principle thereof as defined in the appended claims.

What is claimed is:

1. A meter for use in a fuel oil consumption metering system including a burner of a selectable fuel delivery rate, a delivery means for supplying fuel at a predetermined substantially constant rate to the burner adapted to consume the delivered fuel at said substantially constant rate, the delivery means being selectively operable during any of a plurality of successive time periods of operation, and power means coupled to the delivery means whereby the delivery means draws current during the selective operation of the delivery means, said meter comprising:

(a) measuring means comprising an adjustable pulse rate generator to accommodate the fuel delivery rate of the burner for electronically measuring any of said successive time periods, said measuring means coupled to said power means and being operable to measure the duration of the drawing of said current by said delivery means during any of said successive time periods so as to provide a time measure of the fuel consumed during operation of the burner; and (b) registry means for registering the fuel consumed by the burner during said plurality of said successive time periods of operation, said registry, means being coupled to said measuring means to transfer from said measuring means to said registry means the time measure of the fuel consumed during operation of the burner, said registry means being adapted to accumulate said successive transferred time measures so as to provide a cumulative registry of the total fuel consumed during said time periods.

2. A meter according to claim 1 wherein said variable pulse rate generator is a binary counter divider.

3. A meter according to claim 1 wherein said registering means is adapted so as to be selectively resettable to zero.

4. A meter for use in a fuel oil consumption metering system including a fuel supply as set forth in claim 3 wherein a. the measuring means is operable only during the selective operation of the delivery means;
   b. the registry means is operable for registering the fuel consumed independently of the quantity of fuel in the fuel supply; and
   c. said registry means has a readout expressed in quantity of fuel independently of the quantity of fuel in the fuel supply to provide a cumulative registry of the total fuel consumed during said time periods independently of the quantity of fuel in said fuel supply.

* * * * *

UNITED STATES PATENT AND TRADEMARK OFFICE
CERTIFICATE OF CORRECTION

PATENT NO. : 4,262,530

DATED : April 21, 1981

INVENTOR(S) : ARTHUR S. GERQUEST

It is certified that error appears in the above—identified patent and that said Letters Patent is hereby corrected as shown below:

In column 3, line 44 - "$N_N$ has value $(2)^{N-1}$" should be -- $N_N$ has value $(2)^{N-1}$ --.

Signed and Sealed this

Twenty-eighth Day of July 1981

[SEAL]

Attest:

Attesting Officer

GERALD J. MOSSINGHOFF

Commissioner of Patents and Trademarks